(No Model.)

A. O. BARNES.
ANTIFRICTION BEARING.

No. 554,570. Patented Feb. 11, 1896.

WITNESSES
Geo. W. Anderson
Phil. C. Masi.

INVENTOR
A. O. Barnes
by E. W. Anderson
his Attorney

United States Patent Office.

ARTHUR OLIVER BARNES, OF MOORE PARK, MICHIGAN.

ANTIFRICTION-BEARING.

SPECIFICATION forming part of Letters Patent No. 554,570, dated February 11, 1896.

Application filed March 30, 1895. Serial No. 543,852. (No model.)

*To all whom it may concern:*

Be it known that I, ARTHUR OLIVER BARNES, a citizen of the United States, and a resident of Moore Park, in the county of St. Joseph and State of Michigan, have invented certain new and useful Improvements in Antifriction-Bearings; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
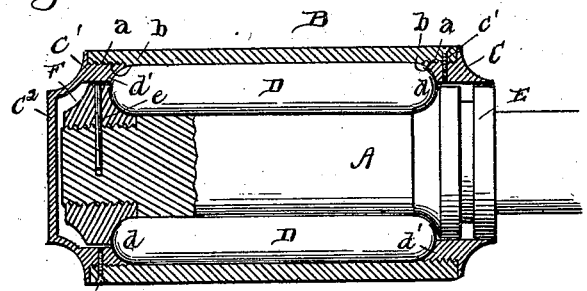
Figure 2:
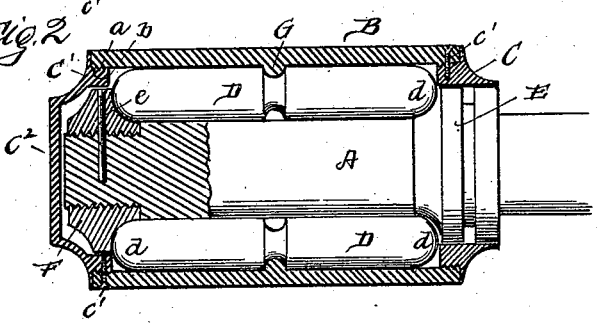

Figure 1 of the drawings is a representation of a central vertical longitudinal section through invention. Fig. 2 is a similar view of a modification, having a rib on boxing and the ends of heads plain.

This invention has relation to certain new and useful improvements in antifriction-bearings, the object being to provide a bearing for vehicle and car axles, shafting, and the like of simple character and construction, but in which the friction is reduced to a minimum.

With this object in view the invention consists in the novel construction and combination of parts, all as hereinafter described, and pointed out in the appended claim.

Referring to the accompanying drawings, Fig. 1, the letter A designates the spindle or journal of a vehicle-axle, and B the boxing of the hub. Said boxing is provided at each end with an interior thread $a$, fitted to receive corresponding threads $b$ of respective heads or caps C C', which screw thereon.

D designates a series of antifriction-rollers, which are disposed around said spindle or journal within the box and in neat bearing-contact with each, there being usually a space of one-fourth of an inch, more or less, according to the particular character of the bearings, between the first and last roller of the series. The head C, which closes the inner end of the boxing, has a circular opening therein to receive the collar or flange E of the axle, being neatly but loosely fitted thereto. The opposite head C' is formed with a chamber of sufficient diameter to admit the axle-nut F, it having a flange extension $C^2$, which forms a cap or guard for said nut to keep out the dust. The rollers are formed with rounded ends $d$, to form bearings for which the inner faces of the respective heads are hollowed out, as indicated at $d'$, the inner face of the nut F and collar E being similarly hollowed or concaved.

G, Fig. 2, designates an internal annular rib, which may be formed on the boxing about midway of the length of the rollers, and which fits peripheral grooves of similar form in the rollers. The meeting faces of this rib and of the rollers may be either flat, angular, or rounded.

The nut F is turned into place and secured by keys $e$. The heads C C' are also locked to the shell by screws $c'$.

Having thus described my invention, what I claim as new, and desire to secure by Letters Patent, is—

In an antifriction-bearing, the combination with the journal, having the nut F and the collar E, of the boxing, the heads C, C', screwed therein and adapted to receive therein respectively said nut and collar, and the series of antifriction-rollers having rounded ends adapted to bear on said nut and collar, substantially as specified.

In testimony whereof I affix my signature in presence of two witnesses.

ARTHUR OLIVER BARNES.

Witnesses:
H. O. BLISS,
JOHN A. THRAP.